US009761924B2

(12) United States Patent
Lagnado et al.

(10) Patent No.: US 9,761,924 B2
(45) Date of Patent: Sep. 12, 2017

(54) WIRED CONNECTOR AND ANTENNA (71) Applicant: Hewlett-Packard Development Company, L.P., Fort Collins, CO (US)

(72) Inventors: Isaac Lagnado, Houston, TX (US); Timothy Neill, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 606 days.

(21) Appl. No.: 13/689,565

(22) Filed: Nov. 29, 2012

(65) Prior Publication Data
US 2014/0146865 A1 May 29, 2014

(51) Int. Cl.
*G06F 3/00* (2006.01)
*H01Q 1/22* (2006.01)
*G06F 11/34* (2006.01)
*H01Q 1/44* (2006.01)

(52) U.S. Cl.
CPC ....... *H01Q 1/2266* (2013.01); *G06F 11/3485* (2013.01); *H01Q 1/44* (2013.01)

(58) Field of Classification Search
None
See application file for complete search history.

(56) References Cited

U.S. PATENT DOCUMENTS

| | | | | |
|---|---|---|---|---|
| 5,680,297 | A * | 10/1997 | Price et al. | 361/818 |
| 6,419,506 | B2 | 7/2002 | Jones et al. | |
| 7,711,325 | B2 * | 5/2010 | Sathath et al. | 455/41.2 |
| 8,018,922 | B2 | 9/2011 | Oak | |
| 2004/0220753 | A1 * | 11/2004 | Tabe | G01N 33/0075 702/32 |
| 2004/0246932 | A1 * | 12/2004 | Fischer | 370/338 |
| 2005/0053008 | A1 * | 3/2005 | Griesing et al. | 370/241 |
| 2005/0107953 | A1 * | 5/2005 | Sugla | 701/300 |
| 2006/0019529 | A1 * | 1/2006 | Ko | H01R 9/05 439/497 |
| 2007/0042767 | A1 * | 2/2007 | Stepanian | 455/420 |
| 2008/0081576 | A1 * | 4/2008 | Olsen | H01Q 13/203 455/187.1 |
| 2008/0167073 | A1 * | 7/2008 | Hobson | H01Q 1/243 455/557 |
| 2009/0298496 | A1 * | 12/2009 | Pettersson et al. | 455/434 |
| 2010/0073243 | A1 * | 3/2010 | Ayala Vazquez | H01Q 1/02 343/702 |
| 2011/0069640 | A1 | 3/2011 | Di Fiore et al. | |
| 2011/0156963 | A1 * | 6/2011 | Rajgopal | H01P 1/203 343/702 |

(Continued)

FOREIGN PATENT DOCUMENTS

CN 201682054 12/2010

OTHER PUBLICATIONS

Lin, et al; "A 2.4-GHz Printed Meander-line Antenna for USB WLAN with Notebook-PC Housing", http://ieeexplore.ieee.org/stamp/stamp.jsp?arnumber=1504825 > on pp. 546-548; vol. 15; Issue: 9, Sep. 2005.

*Primary Examiner* — Henry Tsai
*Assistant Examiner* — Christopher Bartels
(74) *Attorney, Agent, or Firm* — HP Patent Department (57) ABSTRACT

An antenna can be in a computing device. A connector can be in the computing device and adjacent to the antenna for a wired connection. In one implementation the antenna is connector to a controller to monitor the antenna for wireless signal degradation and compensate for the wireless signal degradation.

17 Claims, 8 Drawing Sheets

(56) References Cited

U.S. PATENT DOCUMENTS

| | | | |
|---|---|---|---|
| 2011/0289186 A1* | 11/2011 | Bell | B60R 25/00 |
| | | | 709/217 |
| 2012/0020018 A1 | 1/2012 | Knapton | |
| 2013/0169359 A1* | 7/2013 | Coumou | H03F 3/191 |
| | | | 330/192 |

* cited by examiner

WIRED CONNECTOR AND ANTENNA

BACKGROUND

Computing system may include multiple input/output (I/O) systems. The systems can be a wired I/O such as Ethernet, Universal serial bus (USB), esata, IEEE 1394, thunderbolt, or another system. The I/O systems may be wireless such as Bluetooth, WiFi, Near field Communication or another system. The data packets may be routed to one of the I/O systems based on a priority list of the I/Os in the computing system.

BRIEF DESCRIPTION OF THE DRAWINGS

Some embodiments of the invention are described with respect to the following figures:

FIG. 3b is a top view of an example computing device depicted in FIG. 3a;

DETAILED DESCRIPTION

As computers get smaller, thinner and lighter the components have to be closer together to fit within the housing. Some components may cause interference with another component that causes the other component to malfunction when they are too dose. A wired connector may be on the side of a computer to receive peripheral devices. An antenna may be on the side of the computer to reduce the materials between a wireless signal and the antenna. The wired connector or the antenna may cause interference with the transmission of data when the wired connector and the antenna are in dose proximity or adjacent.

As computers get smaller and thinner there is less room to isolate components from other components that could cause interference that would affect their performance. Putting an antenna adjacent to another component may degrade the wireless signal to the antenna. However if the antenna is adjacent to a wired connector that may degrade the wireless signal it would be acceptable if the wireless connection to a network was replaced by the wired connection to the network.

In one implementation, a computing device can comprise an antenna connected to a wireless module to connect wirelessly to another device. The computing device can comprise a connector adjacent to the antenna for a wired connection to another device. A controller can be connected to monitor signal degradation of the wireless module and attempt to compensate for signal degradation in the first mode when the connector is not connected to the other device. The controller may not compensate for signal degradation in second mode when the connector is connected to another device.

In another implementation, a computing device comprises a chassis. The chassis comprises a side. A connector mounted on the within the chassis on the side. An antenna within the chassis mounted on the side and adjacent to the connector. The antenna at least partially surrounds the connector.

In another implementation, a method of controlling interference in wired and wireless connections includes monitoring the wireless signal degradation of an antenna mounted adjacent to a wired connector. It is determined if there is a connection to the connector. Wireless settings of the wireless signal are changed to compensate for the degradation when the wired connector is not connected. If there is a connection to the connector the monitoring is stopped.

Figure 1:
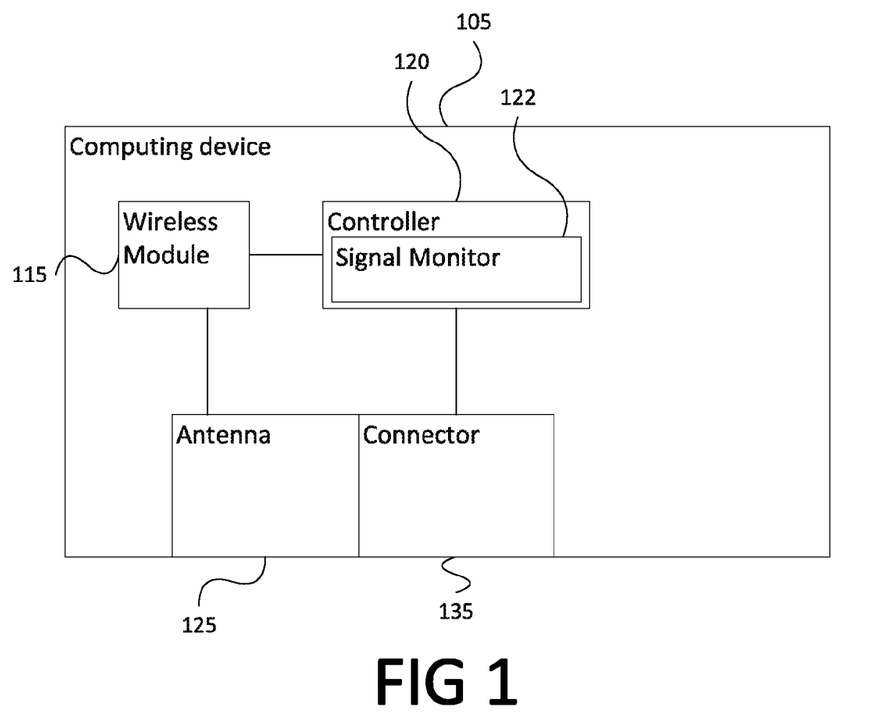
FIG. 1 is a block diagram of a computing device including a wired connector and an antenna according to an example implementation.

With reference to the figures, FIG. 1 is a block diagram of a computing device including a wired connector and an antenna according to an example implementation.

A computing device 105 includes an antenna 125 connected to a wireless module 115 to connect wirelessly to another device. The antenna 125 may be for a wireless connection such as Bluetooth, Near Field Communication (NFC), Wifi, WWAN (Wireless wide area network) such as CDMA (Code division multiple access), LTE (Long term evolution), GSM (Global System for Mobile Communication), or another wireless connection. The wireless module 115 may be a specific module for the antenna or may support multiple wireless protocols. The antenna may be tuned to support specific frequencies or multiple frequencies, for example a Wifi antenna may be tuned to 2.4 gigahertz.

The computing device 105 includes a connector 135 adjacent to the antenna 125. An adjacent connector 135 may be touching the antenna 125 or may mean that there is no other component between the antenna 125 and the connector 135. Adjacent many also mean that the connectors are in a defined volume of space. The connector 135 is for a wired connection to another device. The connector may be for example an RJ45 port, to support Ethernet, or may be another connector such as a USB port.

A controller 120 may include a signal monitor 122 to monitor signal degradation of the wireless module 115. The degradation may be created by interference from other components. The interference may be physical interference such as RF loading caused by the wires of a wired connection may cause antenna to be de-tuned even if there is no signal on the wires or the interference may be caused by the signals on the wires which could create RF (radio frequency) interference for example. The controller 120 can compensate for signal degradation in the first mode when the connector 135 is not connected to the other device. The compensation may be for example changing the channel of a wifi connection, changing the frequency of a WWAN connection, boosting the power to the antenna, or another way to compensate. The controller 120 may not compensate for signal degradation in second mode when the connector 135 is connected to another device such as if the connector is an Ethernet port connecting the computing device 105 to a network. If there is a network connection it may be less important for the controller to compensate for the signal degradation since the computer has a network connection though a connection other than the wireless connection.

Figure 2:
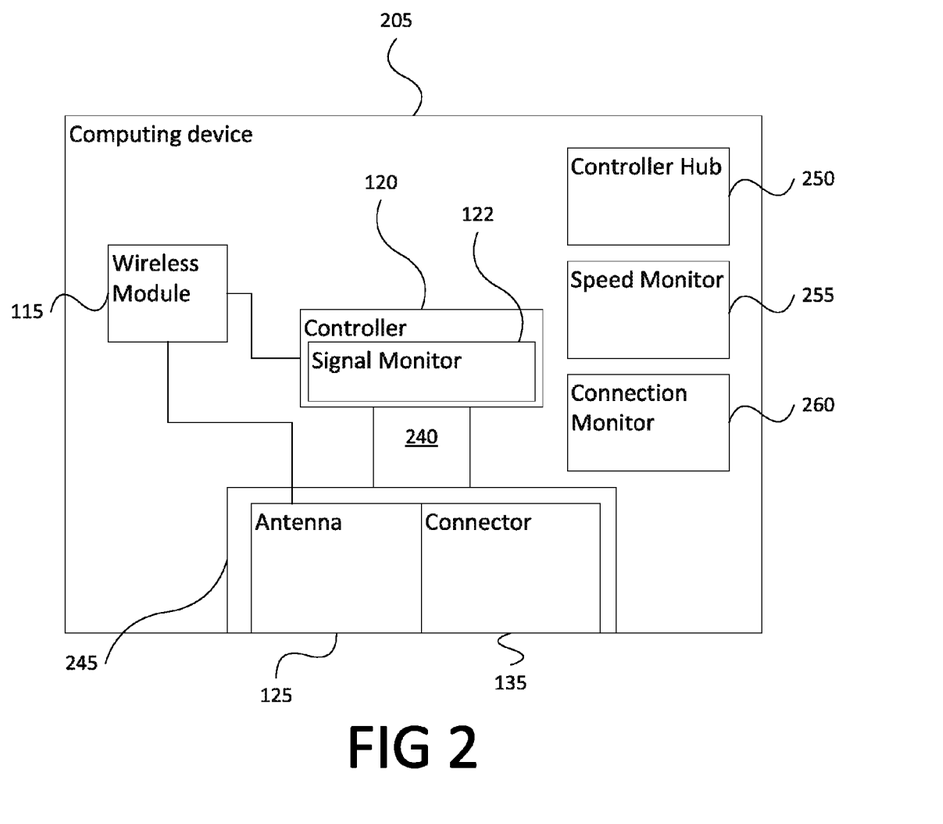
FIG. 2 is a block diagram of a computing device including a wired connector and an antenna according to an example implementation.

FIG. 2 is a block diagram of a computing system 205 including a wired connector 135 and an antenna 125 according to an example implementation. The antenna 125 and the connector 135 are on the same cable 240. The cable may be any type of cable including a ribbon cable. The ribbon cable may be connected to the controller 120 and the wireless module 115. The controller and the wireless module may be part of an integrated circuit (IC), may be part of a package or may be in individual packages.

A housing 245 can comprise the connector 135 and the antenna 125. The housing 245 may be a plastic housing or another material that does not interfere with the antenna or the connector. A housing that comprises the antenna 125 and the connector 135 may increase installation efficiency by allowing the antenna 125 and the connector 135 to be installed when the housing 245 is installed. A ribbon cable may connect to all of the components in the housing such as the antenna 125 and the connector 135.

The controller 120 may disable the wireless module 115 when the connector 135 is connected to another device. A wireless module may cause interference in the wired connection and the controller may detect that interference and turn off the wireless module to reduce the interference from the antenna 125 in the connector 135. The controller 120 may also turn off the wireless module 115 to reduce the power used when the computing device 205 is connected to a network through the connector 135.

A speed monitor 255 in the computing device 205 can determine if the wired connection is faster than the last known speed of the wireless connection before the wired connection was established and disable the wired connection if the speed of the wireless connection was faster. The speed monitor 255 can set a threshold level of the last known speed of the wireless connection for example if the wireless connection was downloading at 5 megabytes per second the threshold can be set at 5 megabytes and if the wired connection is less than 5 megabytes the speed monitor 255 determines that the wired connection should be disabled and the wireless connection should be used for data transfer.

A connection monitor 260 in the computing device 205 may determine if the information requested by the computing device through a wired connection and if the information is not available then determine from logs if it was available through the wireless connection and disable the wired connection. The connection monitor 260 can determine if the network access available through either the wireless connection and the wired connection are available, for example if a server containing an html (hypertext markup language) service is available through the wireless connection then it is logged and when the wired connection is established through the connector 135 it is determined if the data available through the wireless connection is available thought the wired connection. If the data is not available through one of the wired connection or the wireless connection the one without the data may be disabled to reduce signal degradation of the other.

A controller hub 250 in the computing device 205 may determine if the wired connection is degraded by the wireless module if there is a connection to the connector and disable the wireless module. For example the connector may have interference introduced in the signals on the wired connection by the wireless signals created by the antenna 125 or by the cabling driving the signal to the antenna 125 from the wireless module 115. To reduce the interference from the antenna 125 on the connector 135 the computing device 205 may turn the wireless module 115 off.

Figure 3A:
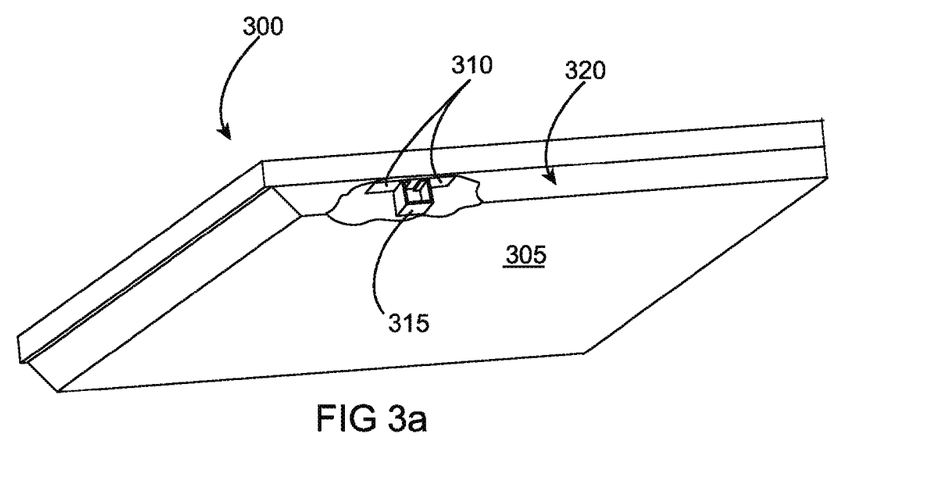
FIG. 3a is perspective view of a computing device according to an example implementation.

FIG. 3a is perspective view of a computing device according to an example implementation. The computing device 300 can include a chassis 305 comprising a side 320. A connector 315 is mounted on the side 320 of the chassis 305. Part of the chassis around the connector 315 is not shown in FIG. 3a for descriptive purposes of the location of the connector 315 and the antenna 310.

An antenna 310 is within the chassis 305 adjacent to the side 320 and adjacent to the connector 315. The side may not be parallel to the connector 315 however there are no components between the side 320 and the connector 315. The antenna 310 may be a flat antenna where the thickness of the antenna 310 is much less than the length and the width of the antenna 310. If the antenna is adjacent to the side 320 of the chassis 305 there is no other component between the side 320 of the chassis 305 and the antenna 310. The antenna 310 may be adjacent to at least one side of the connector 315. The antenna 310 may also be adjacent to more than one side of the connector 315, for example the antenna 310 may be angled such as 90 degrees. The antenna 310 at least partially surrounds the connector 315. Partially surrounds means adjacent to at least one side.

The antenna may be printed on the surface of the connector 315 with conductive ink for example. The conductive ink may be printed on more than one surface of the connector. The connector 315 and the antenna 310 can be in the volume.

The side 320 has an opening to allow access to the connector 315. The antenna 310 may be in the opening to allow the antenna to operate without having to signal through the chassis.

Figure 3B:
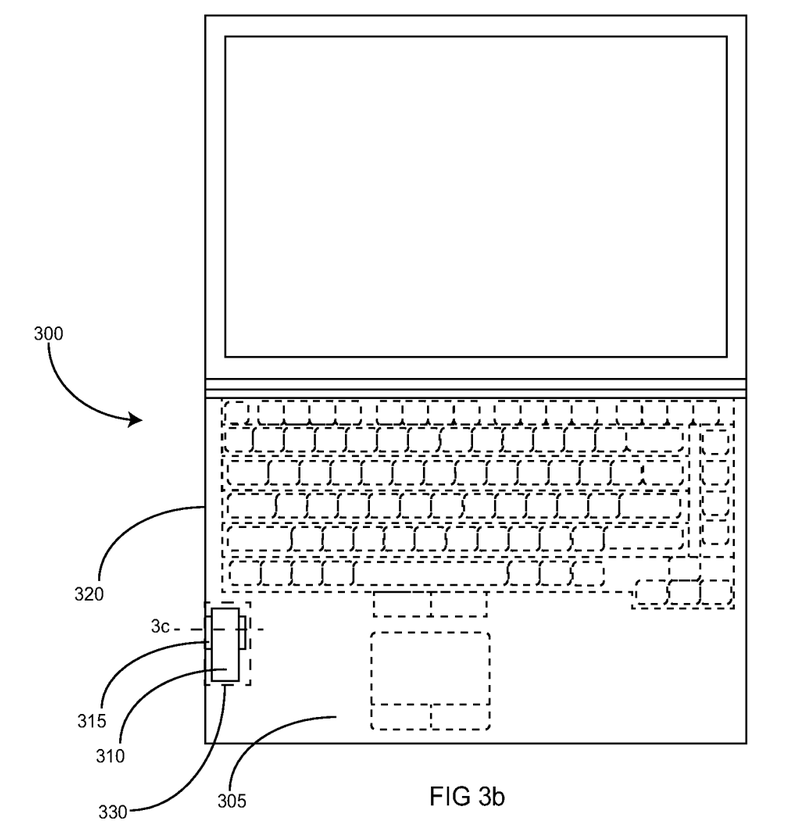

FIG. 3b is a top view of an example computing device depicted in FIG. 3a. The top view of the computing device has the keyboard deck removed so that the connector 315 and the antenna 310 are visible from the top view. A keyboard and pointing device are depicted in dotted lines for context. The computing device 300 includes a chassis 305 including a connector 315 and an antenna 310. The connector 315 and the antenna 310 can be in the volume 330. The volume 330 may be an area that is large enough for the antenna 310 and the connector 315 and no other components. The connector 315 and the antenna 310 are adjacent to one another with no other components between them.

Figure 3C:
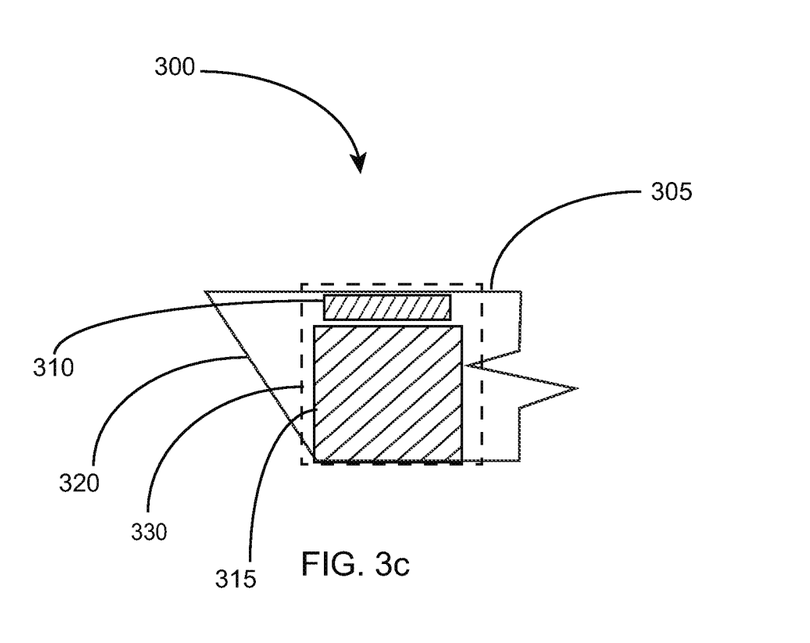
FIG. 3c is a cross section of an example computing device depicted in FIGS. 3a and 3b.

FIG. 3c is a cross section of an example computing device depicted in FIGS. 3a and 3b. The cross section is across dotted line 3c in FIG. 3b. The volume 330 is large enough for the antenna 310 and the connector 315 and no other components. The connector 315 and the antenna 310 are adjacent to one another with no other components between them.

Figure 4:
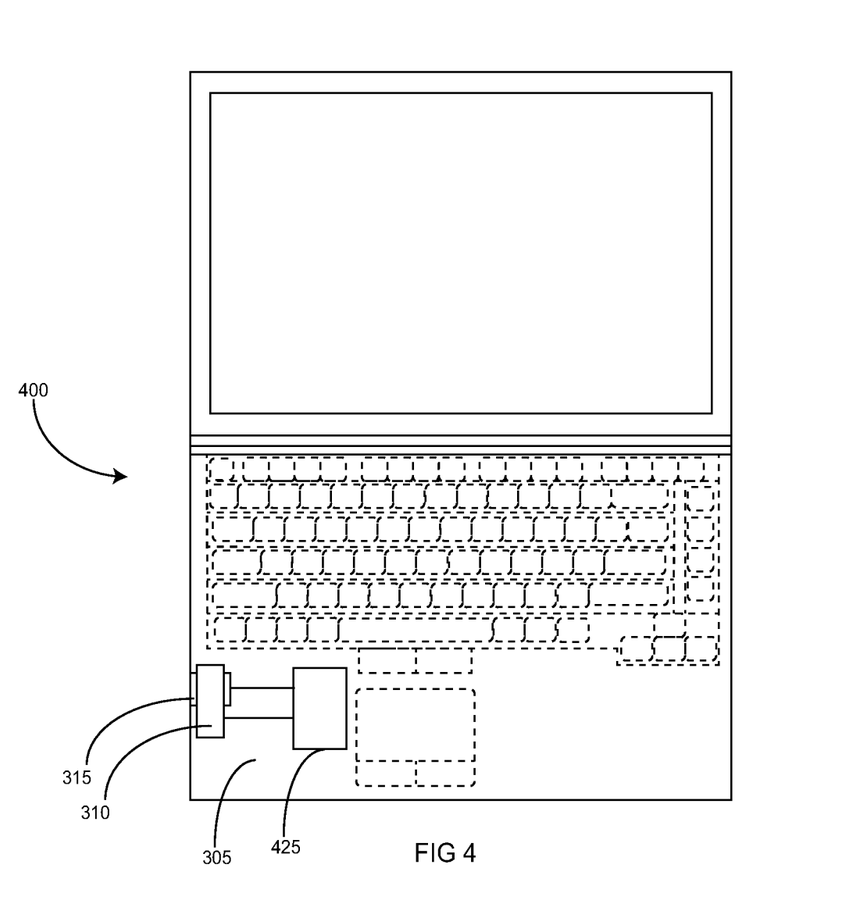
FIG. 4 is a computing device according to an example implementation.

FIG. 4 is a computing device 400 according to an example implementation. A controller 425 is connected to the antenna 310 to monitor wireless signal degradation. The controller 425 can disable the wired connection to the connector 315 if the wireless signal degradation exceeds a threshold.

The controller 425 may throttle the wired connection if the wireless signal degradation exceeds a threshold. For example the controller may cause the wired connection to reduce to a lower speed protocol such as moving from gigabit Ethernet to 10baseT a reduction from 1 gigabit per-second to 10 megabits per-second which may reduce the signal degradation of the wireless module.

The controller 425 may compare the network of the wireless module to the network of the wired module and if they are the same send packets through the highest speed connection. For example if the wired connection was a 10base-T connection at 10 megabits and the wireless connection was a wifi connection at 56 megabits per-second the controller 425 may send the data packets through the wifi connection even if there is signal degradation on the connection. The controller 425 may also disable the slower of the wireless and wired connection. The controller 425 may adjust the wired and wireless connections to maximize speed if they are connected to different networks.

Figure 5:
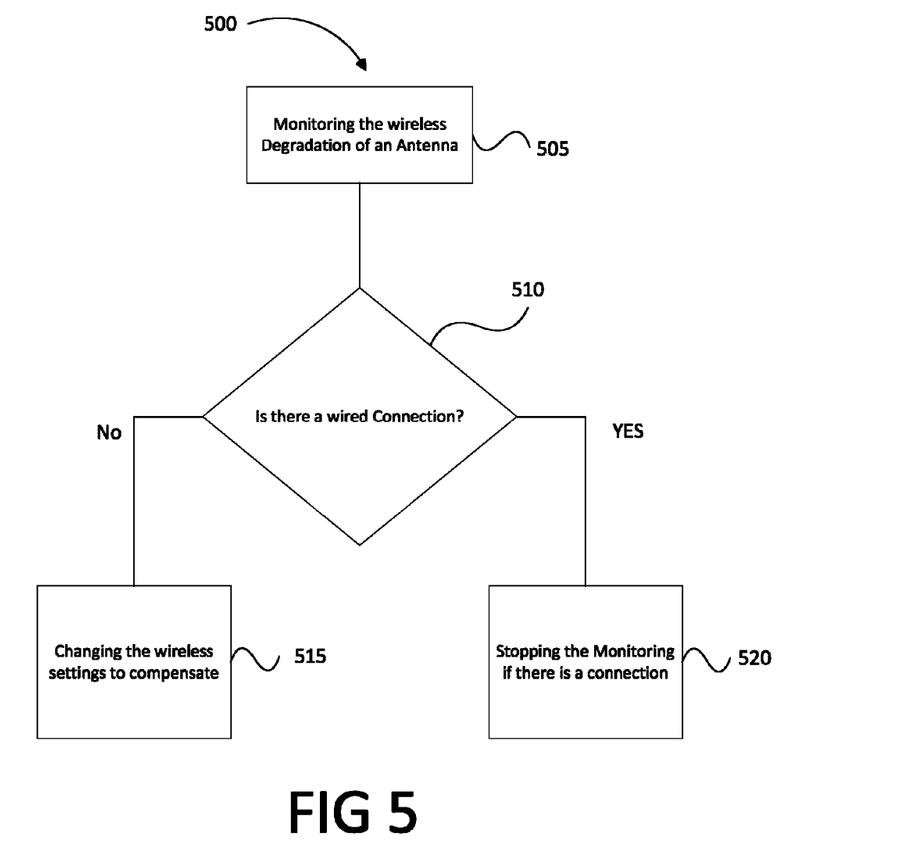
FIG. 5 is a flow diagram of a method of controlling interference in wired and wireless connections according to an example implementation.

FIG. 5 is a flow diagram of a method of controlling interference in wired and wireless connections according to an example implementation.

A method 500 of controlling interference in wired and wireless connections includes monitoring the wireless signal degradation of an antenna mounted adjacent to a wired connector at 505. It is determined at 510 if there is a wired connection. If there is not a wired connection the method continues to 515 where wireless settings are changed to compensate for the degradation of the wireless signal when the wired connector is not connected. If there is a wired connection determined at 510 the method continues to 520 and monitoring is stopped.

Figure 6:
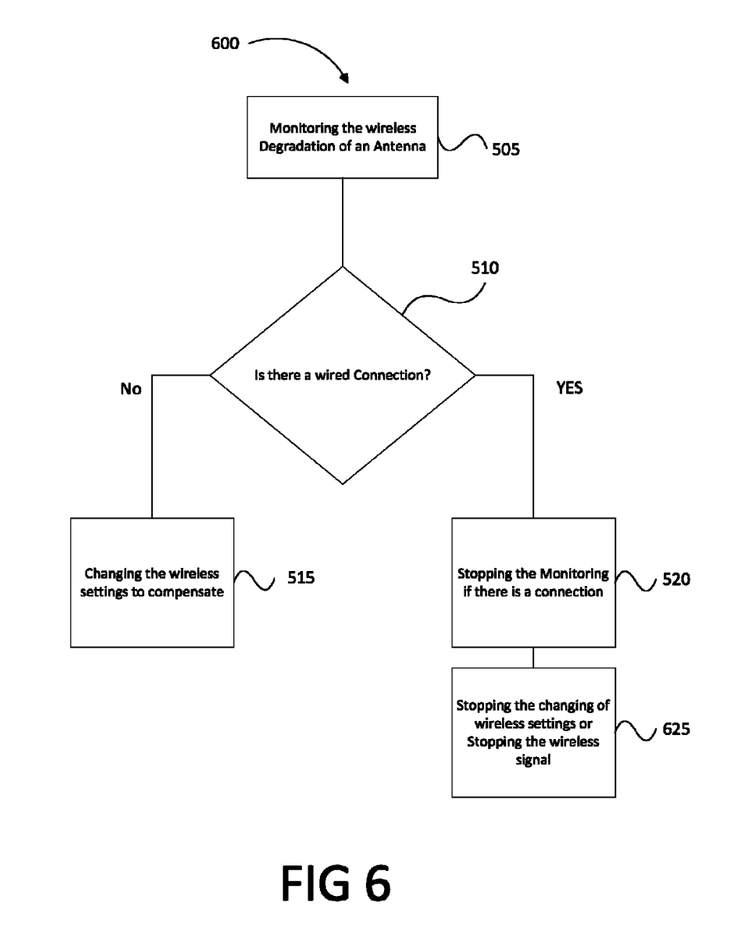
FIG. 6 is a flow diagram of a method of controlling interference in wired and wireless connections according to an example implementation.

FIG. 6 is a flow diagram of a method of controlling interference in wired and wireless connections according to an example implementation.

A method 600 of controlling interference in wired and wireless connections includes monitoring the wireless signal degradation of an antenna mounted adjacent to a wired connector at 505. It is determined at 510 if there is a wired connection. If there is not a wired connection the method continues to 515 where wireless settings are changed to compensate for the degradation of the wireless signal when the wired connector is not connected. If there is a wired connection determined at 510 the method continues to 520 and monitoring is stopped. The changing of the wireless settings is stopped when the monitoring is stopped at 525 or the wireless signal is stopped when it is determined there is a connection to the connector at 625.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
   an antenna connected to a wireless module to create a wireless network connection;
   a wired connector for a wired network connection and directly touching a surface of the antenna, wherein the antenna at least partially surrounds the wired connector with no component(s) between the antenna and the wired connector, and the antenna comprises an electrically conductive ink printed on a surface of the wired connector; and
   a controller to:
      monitor for signal degradation of the wireless module;
      in response to detecting the signal degradation, determine whether the wired connector is connected to another device;
      in response to determining that the wired connector is not connected to the another device, compensate for the signal degradation in a first mode by adjusting a wireless setting of wireless communication using the antenna to change from performing wireless communication using a first wireless setting to performing wireless communication using a second wireless setting different from the first wireless setting; and
      in response to determining that the wired connector is connected to the another device, not attempt to compensate for the signal degradation in a second mode.

2. The computing device of claim 1, further comprising a housing comprising the wired connector and the antenna.

3. The computing device of claim 1, wherein the controller is to disable the wireless module in response to determining that the wired connector is connected to the another device.

4. The computing device of claim 1, further comprising a speed monitor to determine if a last known speed of the wireless network connection before the wired network connection was established is greater than a speed of the wired network connection, and wherein the controller is to disable the wired network connection in response to the last known speed of the wireless network connection being greater than the speed of the wired network connection.

5. The computing device of claim 1, wherein the adjusting of the wireless setting comprises adjusting a frequency of wireless communication from a first frequency to a second frequency different from the first frequency.

6. The computing device of claim 1, wherein the adjusting of the wireless setting comprises boosting a power of transmission by the antenna.

7. The computing device of claim 1, wherein the controller is to disable the wired network connection in response to determining that the signal degradation exceeds a specified threshold.

8. The computing device of claim 1, wherein the controller is to reduce a speed of the wired network connection from a first non-zero speed to a second non-zero speed, in response to determining that the signal degradation exceeds a specified threshold.

9. A computing device comprising:
   a chassis comprising a side;
   a wired connector adjacent to the side of the chassis for a wired network connection;
   an antenna within the chassis adjacent to the side and adjacent to and directly touching a surface of the wired connector with no component(s) between the antenna and the surface of the wired connector, wherein the antenna at least partially surrounds the wired connector, and the antenna comprises an electrically conductive ink printed on the surface of the wired connector.

10. The computing device of claim 9, further comprising a controller to:

monitor for wireless signal degradation of wireless communication using the antenna; and disable or throttle the wired network connection in response to determining that the wireless signal degradation exceeds a specified threshold.

11. The device of claim 9, further comprising a controller to:

compare a connection speed of the wired network connection to a connection speed of a wireless network connection established with the antenna; and disable, based on the comparing, a slower one of the wired network connection and the wireless network connection.

12. The computing device of claim 9, further comprising a controller to:

monitor for wireless signal degradation of wireless communication using the antenna;

in response to detecting the wireless signal degradation, determine whether the wired connector is connected to another device;

in response to determining that the wired connector is not connected to the another device, compensate for the wireless signal degradation by adjusting a wireless setting of wireless communication using the antenna to change from performing wireless communication using a first wireless setting to performing wireless communication using a second wireless setting different from the first wireless setting; and in response to determining that the wired connector is connected to the another device, not attempt to compensate for the wireless signal degradation.

13. The computing device of claim 12, wherein the adjusting of the wireless setting comprises adjusting a frequency of wireless communication from a first frequency to a second frequency different from the first frequency.

14. The computing device of claim 12, wherein the adjusting of the wireless setting comprises boosting a power of transmission by the antenna.

15. A method of controlling interference for a computing device, comprising:

monitoring for wireless signal degradation of an antenna mounted adjacent to and directly touching a surface of a wired connector, wherein the antenna at least partially surrounds a side of the wired connector, and the antenna comprises an electrically conductive ink printed on the surface of the wired connector;

in response to detecting the wireless signal degradation, determining, by a controller in the computing device, whether the wired connector is connected to another device;

in response to determining that the wired connector is not connected to the another device, changing, by the controller, wireless settings to compensate for the wireless signal degradation, wherein changing the wireless settings causes the computing device to change from performing wireless communication using a first wireless setting to performing wireless communication using a second wireless setting different from the first wireless setting; and in response to determining that the wired connector is connected to the another device, stopping the monitoring.

16. The method of claim 15, wherein changing the wireless settings comprises adjusting a frequency of wireless communication using the antenna from a first frequency to a second frequency different from the first frequency.

17. The method of claim 15, wherein changing the wireless settings comprises boosting a power of transmission by the antenna.

\* \* \* \* \*

UNITED STATES PATENT AND TRADEMARK OFFICE
CERTIFICATE OF CORRECTION

PATENT NO. : 9,761,924 B2
APPLICATION NO. : 13/689565
DATED : September 12, 2017
INVENTOR(S) : Isaac Lagnado et al.

Page 1 of 1

It is certified that error appears in the above-identified patent and that said Letters Patent is hereby corrected as shown below:

In Column 7, Line 6, in Claim 11, delete "The device" and insert -- The computing device --, therefor.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*